United States Patent
Ijiri

(10) Patent No.: US 8,111,680 B2
(45) Date of Patent: Feb. 7, 2012

(54) MOBILE OBJECT INFORMATION SHARING SYSTEM

(75) Inventor: Masao Ijiri, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 598 days.

(21) Appl. No.: 11/659,692

(22) PCT Filed: Apr. 7, 2005

(86) PCT No.: PCT/JP2005/006879
§ 371 (c)(1),
(2), (4) Date: Feb. 8, 2007

(87) PCT Pub. No.: WO2006/114838
PCT Pub. Date: Nov. 2, 2006

(65) Prior Publication Data
US 2008/0043715 A1    Feb. 21, 2008

(51) Int. Cl.
*H04J 3/00* (2006.01)

(52) U.S. Cl. ........ 370/345; 370/347; 370/350; 370/458; 370/459; 455/404.2; 455/456.1

(58) Field of Classification Search .......... 370/345–350, 370/294, 326, 313, 337, 431–433, 437, 458–459; 455/440, 441, 456.1–456.6, 457, 458, 569.2, 455/404.2; 701/200–216
See application file for complete search history.

(56) References Cited

U.S. PATENT DOCUMENTS

| | | | | |
|---|---|---|---|---|
| 5,365,516 A * | 11/1994 | Jandrell | ........................ | 370/335 |
| 5,535,251 A * | 7/1996 | Sugawara | ..................... | 375/356 |
| 5,570,347 A * | 10/1996 | Bestler et al. | ................. | 370/461 |
| 6,028,853 A * | 2/2000 | Haartsen | ....................... | 370/338 |
| 6,683,848 B1 * | 1/2004 | Parrish | .......................... | 370/218 |
| 7,181,230 B2 * | 2/2007 | Nonoyama et al. | ........... | 455/457 |
| 7,289,541 B2 * | 10/2007 | Elam | ............................. | 370/508 |
| 2002/0193945 A1 * | 12/2002 | Tan et al. | ...................... | 701/213 |
| 2004/0039504 A1 * | 2/2004 | Coffee et al. | ................... | 701/35 |
| 2005/0065715 A1 | 3/2005 | Watanabe | | |
| 2005/0079883 A1 * | 4/2005 | Khawand et al. | ............. | 455/502 |
| 2005/0090201 A1 * | 4/2005 | Lengies et al. | ............... | 455/41.2 |
| 2009/0048750 A1 * | 2/2009 | Breed | ............................. | 701/70 |

FOREIGN PATENT DOCUMENTS

JP    8-130774    5/1996
(Continued)

*Primary Examiner* — Kent Chang
*Assistant Examiner* — Magdi Elhag
(74) *Attorney, Agent, or Firm* — Buchanan Ingersoll & Rooney PC

(57) ABSTRACT

In a system where mobile stations use one frequency to transmit/receive and share position information data, synchronization has been made in a shared time resulting from GPS and the mobile stations transmit the data at mutually different timings that are predetermined, whereby overlapping of the transmissions is avoided. However, the transmission period of a station cannot be changed even if that station wants to change its transmission period. Transmission period determining units are disposed which determine transmission periods on the basis of the moving speeds of mobile stations. The mobile stations are time-synchronized by GPS. After the time synchronization, fundamental transmission periods comprising plural time slots are disposed. Transmission is done just in one time slot within one fundamental transmission period normally, and the number of transmissions is increased to two times or three times within one fundamental transmission period when the period is to be shortened.

2 Claims, 12 Drawing Sheets

FOREIGN PATENT DOCUMENTS

| | | |
|---|---|---|
| JP | 10-224316 | 8/1998 |
| JP | 2003-264861 | 9/2003 |
| JP | 2004-146893 | 5/2004 |
| JP | 2004-220262 | 8/2004 |
| JP | 2005-84790 | 3/2005 |

* cited by examiner

MOBILE OBJECT INFORMATION SHARING SYSTEM

TECHNICAL FIELD

The present invention relates to a mobile object information sharing system where mobile wireless stations installed in plural mobile objects and a base station that manages the movement of those mobile objects mutually use the same radio frequency to share position information and other information of the mobile objects.

BACKGROUND ART

Technology which satisfies the demand to grasp and manage in real time the positions and other information of plural mobile radio stations has conventionally been desired, without having to describe the example of radio-dispatched taxis, and is already being utilized as mobile object information sharing systems. In this case, usually both the base station and the mobile stations use one frequency that is the same in order to ensure that the number of radio frequencies used does not increase.

For example, in Patent Document 1, a data transmission system is disclosed where, in a conventional mobile object information sharing system in which mobile objects mutually use the same radio frequency, in order to avoid interference resulting from plural stations transmitting at the same frequency at the same time, a shared standard time base is disposed in plural mobile radio stations (also called terminal stations) and mutually different times are allocated to the terminal stations as unique transmission timings on the standard time base, whereby time division communication that avoids overlapping of the transmission timings is conducted without requiring control of the communication from the base station.

However, the position information of the mobile objects must of course be transmitted at more frequent intervals when the mobile objects are moving at a high speed than when the mobile objects are moving at a low speed or are stopped. Yet in the case of the above system, the timings when the stations can transmit their position information are determined beforehand. For this reason, there has been the problem that when a mobile object in motion wishes to provide the position information of its own station at more frequent intervals than the ordinary time intervals, the mobile object cannot change the transmission period or timing as needed, must wait for the communication of non-urgent stations and cannot transmit the position information until its turn, and cannot timely provide effective position information because its position ends up changing greatly during that time.

Patent Document 1: JP-A-08-130774 (pp. 3-5; FIG. 1)

DISCLOSURE OF THE INVENTION

Problem that the Invention is to Solve

In the conventional mobile object information sharing system, the shared standard time base is disposed in the plural terminal stations and unique transmission timings are given to the terminal stations by allocating mutually different times within the period of the standard time base to the terminal stations, whereby time division transmission control is conducted such that overlapping of the transmission timings (communication interference) is avoided in the communication between the plural stations without requiring control of the communication timings from the base station. Thus, because predetermined times within the shared standard time base are allocated to the stations and cannot be easily changed, there has been the problem that it is difficult to change the transmission period of just a specific station as needed.

The present invention has been made in order to solve this problem, and it is an object thereof to provide a mobile object information sharing system which, in a system that conducts time division transmission control such that overlapping of transmission timings (communication interference) in communication between plural stations using a shared frequency is avoided, can automatically change the transmission period of the position information of its own station as needed by a change in the moving speed of its own station or its own activity status.

Means for Solving the Problem

A mobile object information sharing system pertaining to this invention comprise a plurality of mobile stations, wherein the mobile station includes: a radio device for communicating mutually at one radio frequency;

a GPS receiver that obtains, by GPS radio waves, at least position information and moving speed information of its own station and shared time information;

a time division synchronous radio modem device that synchronizes mutually among the plurality of mobile stations using the shared time information, after this time synchronization, sets a fundamental transmission period by arranging continuously a plurality of transmission slots having a predetermined time width, transmits the position information of its own station to the radio device in an optional period of the plurality of transmission slots, and receives the position information of other mobile stations;

a transmission period determining unit for determining the optional period using the moving speed of the mobile station; and an operation unit that determines a transmission timing among the plurality of transmission slots based on the optional period determined by the transmission period determining unit and transmits the position information of its own station.

EFFECTS OF THE INVENTION

According to this invention, by disposing in a time division radio modem device a transmission period determining unit that determines the transmission period on the basis of the moving speed of its own station, the transmission period can be determined in accordance with the moving speed. Time division slots can be effectively utilized by setting the transmission period to be short when the mobile object is moving at a high speed and setting the transmission period to be long when the moving speed is slow, for example. Thus, there is the effect that the positions of more mobile stations can be grasped and other information such as images can be transmitted.

Further, by disposing an activity status storage unit that sets and stores the activity status of its own station and a transmission period determining unit that determines the transmission period on the basis of the activity status of its own station, the transmission period can be set in accordance with the activity status. Time division slots can be effectively utilized in the same manner as described above by setting the transmission period to be long when the mobile object is stopped and conducting some kind of work and setting the transmission period to be short when the mobile object is in motion, for example.

BEST MODES FOR IMPLEMENTING THE INVENTION

First Embodiment

A mobile object information sharing system of a first embodiment of this invention will be described below on the basis of FIG. 1.

FIG. 1 is a block diagram showing the mobile object information sharing system according to the first embodiment of this invention. In FIG. 1, mobile stations 1 (1-1, 1-2, etc., to 1-N) and a base station 100 conduct radio communication using a single frequency via communication antennas 54 (54-1, 54-2, etc., to 54-N) and a communication antenna 154 that they respectively have.

In addition to the communication antenna 54, each of the mobile stations 1 is disposed with at least a GPS antenna 11, a time division synchronous radio modem device 20, a speaker 51, a microphone 52, a radio device 53, and a position information display device 60. These constituent elements will be sequentially described below.

The GPS antenna 11 receives GPS position information and time information. Here, the GPS position information is information including at least one of the latitude, longitude, moving direction, and moving speed of its own mobile station 1 (called "its own station" below).

It will be noted that in the following description, the position information and the time information will be collectively described as the position information.

The time division synchronous radio modem device 20 has a GPS receiving unit 21 (the GPS antenna and the GPS receiving unit will be collectively referred to as a GPS receiver), a transmission period determining unit 22, an operation unit 30, and a radio modem unit 40, and is connected to the position information display device 60 via the Ethernet (registered trademark). The GPS receiving unit 21 acquires position information (including moving speed and time information; the same below) of its own station from the GPS antenna 11 and transmits this position information to the transmission period determining unit 22 and the operation unit 30 every second, for example. The operation unit 30 transmits this position information to an operation unit 80 of the position information display device 60 every second, and on the basis of the transmission period determined by the transmission period determining unit 22, determines the data transmission timing of periodic position information communication and transmits the position information of its own station to the radio modem unit 40 such that communication interference (when several stations transmit at the same time and at the same frequency) is avoided. Further, the operation unit 30 transmits, to the operation unit 80 of the position information display device 60, reception data of the position information of the other stations converted by the radio modem unit 40.

The radio modem unit 40 converts data into a format that can be transmitted by the radio device 53 when the data of the position information of its own station is to be transmitted and delivers the data to the radio device 53. The radio modem unit 40 can conduct audio communication with the microphone 52 and the speaker 51 connected to the radio modem unit 40. Further, the radio modem unit 40 converts the reception data of the position information of the other stations received by the radio device 53 into a format that can be digitally processed by the operation unit 30.

The radio device 53 is a radio device for conducting radio communication mutually at one radio frequency with the other stations. Even if an analog radio device for audio communication is used as the radio device 53, the radio device 53 can communicate digital information such as position information and images because the radio modem unit 40 conducts data conversion.

The speaker 51 receives the output of the radio modem unit 40 and outputs audio.

The microphone 52 includes a PTT (press-to-talk) push button or switch that is operated to switch the microphone from an ordinary receiving state to a transmitting state and input audio to the radio modem unit 40.

The position information display device 60 includes an input/output unit 70, the operation unit 80, map data 91, shared data 92, and a display unit 93. In the input/output unit 70, fundamental periods of periodic position information communication are set by a GUI (Graphical User Interface) function. The fundamental periods are set such that they are shared by all of the stations. Further, a station ID is set in each of the mobile stations 1 and the base station 100.

The operation unit 80 stores in the shared data 92 the position information received from the operation unit 30 of the time division synchronous radio modem device 20, processes the map data 91 such that the position of its own station is in the center of a map, displays the position information of its own station on the display unit 93, and displays the positions of the other stations obtained by communication on the map.

For the position information display device 60, a desktop PC, a notebook PC, a tablet PC, or a PDA is applied to match the specifications of each of the mobile stations.

Further, the base station 100 has the same configuration as that of the mobile stations 1.

Namely, the base station 100 is disposed with a time division synchronous radio modem device 120, a speaker 151, a microphone 152, a radio device 153, and a position information display device 160. The time division synchronous radio modem device 120 includes a GPS Receiving Unit 121, an operation unit 130, and a radio modem unit 140. The position information display device 160 includes an input/output unit 170, an operation unit 180, map data 191, shared data 192, and a display unit 193. It will be noted that the internal configurations and operations of the operation unit 130, the radio modem unit 140, the input/output unit 170, and the operation unit 180 are identical to those of the mobile stations 1 described in FIG. 2 and FIG. 3.

FIG. 2 is a block diagram showing the time division synchronous radio modem device 20 used in the mobile stations I of the mobile object information sharing system according to the first embodiment of this invention. A time division synchronous radio modem device synchronize mutually among the plurality of mobile stations using the shared time information. It will be noted that because portions having identical reference numerals in the drawings represent the same or corresponding portions, repetition of the detailed description thereof will be omitted.

The operation unit 30 in FIG. 2 includes a position information sending unit 31 that sends the position information of its own station and of the other stations to the position information display device 60, a communication status judging unit 32 that judges the communication status, and a timing control unit 33 that determines the timing to transmit the position information of its own station in the period determined by the transmission period determining unit 22. The radio modem unit 40 includes an audio call control unit 41 that inputs/outputs audio to the speaker 51 and the microphone 52 and a modulation and demodulation unit 42 that conducts data modulation and demodulation.

FIG. 3 is a block diagram showing the position information display device 60 in the mobile object information sharing system according to the first embodiment of this invention.

The input/output unit 70 includes fundamental period setting means 71 that sets fundamental periods when transmitting the position information of its own station and own station ID setting means 72 that sets the ID of its own station. The operation unit 80 includes a position information receiving unit 81 that receives the position information of its own station and of the other stations and an on-map mobile station position display processing unit 82 that displays the positions of its own station and of the other stations on a map.

FIG. 4 is a diagram describing the configuration of a position information packet in the mobile object information sharing system according to the first embodiment of this invention.

In FIG. 4, a position information packet 1AB configured by a header 1A and data 1B is transmitted in a later-described communication time slot T, with a communication interference verification time T0 for verifying communication interference with the other stations being disposed. The transmission destination, the transmission period, the transmission timing, and the number of simultaneously active mobile stations are included in the header 1A.

The communication interference verification time T0 is a time to verify that data is not being received in X seconds prior to the start of transmission, which serves as a condition for the start of transmission. The communication time slot T is predetermined time width, and is the shortest time required to transmit the packet, and is called the shortest transmission time.

FIG. 5 is a diagram showing position information packet transmission timings in the mobile object information sharing system according to the first embodiment of this invention, and the horizontal axis represents the flow of time.

In FIG. 5, the transmission timing control unit 33 uses unused communication time slots 3 (in FIG. 5, the first slots in the fundamental transmission periods as an example) in the fundamental periods (fundamental transmission periods) to transmit a position information packet 2 of its own station after packet use status verification times L corresponding to the fundamental periods.

Prior to the operation of the mobile object information sharing system, first, the shortest transmission time T in FIG. 2 is set, and when the mobile object information sharing system is in operation, this shortest transmission time T is predetermined and fixed for all the stations. The length of this set shortest transmission time T is the length of the communication time slot 3. The number of communication time slots in each fundamental period is equal to the fundamental period (packet use status verification time) divided by the time slots 3 (in FIG. 5, there are eight as an example).

FIG. 6 is a diagram showing transmission timings after the interference of position information packets in the mobile object information sharing system according to the first embodiment of this invention.

In FIG. 6, position information packets 2 of a first station and a second station are interfering with each other (fat Xs in the drawing).

FIG. 7 is a flowchart showing position information transmission processing by the operation unit 30 of the time division synchronous radio modem device 20 in the mobile object information sharing system according to the first embodiment of this invention.

FIG. 8 is a diagram showing various position information transmission periods in the mobile object information sharing system according to the first embodiment of this invention.

Next, the operation will be described.

In the mobile station 1, the position information and time information received by the GPS antenna 11 is acquired by the GPS receiving unit 21 and sent to the transmission period determining unit 22 and the operation unit 30. The transmission period determining unit 22 determines, in divisional periods of the fundamental periods—such as "fundamental period 1", "fundamental period ½" and "fundamental period ¼"—the transmission period from the moving speed in the position information of it's own station and a predetermined table. The transmission timing control unit 33 of the operation unit 30 defines a communication time slot for time division communication based on precisely measured time such as GPS time information in accordance with the transmission period determined by the transmission period determining unit 22.

To give a specific example, when, for example, the fundamental period is 40 seconds, the shortest transmission time is 5 seconds (i.e., there are 8 time slots), and the transmission period determined by the transmission period determining unit 22 is "fundamental period×1", then the transmission timing control unit 33 defines the first communication time slot based on the time when the unit of seconds of the precisely measured time obtained from GPS (which is shared by each of the stations; there is no time difference) is 0 or a multiple of 5 and then delimits the communication time slots in time intervals of the shortest transmission time. Thus, the communication time slots of the stations become synchronized.

The transmission timing control unit 33 determines the transmission timing when periodically transmitting the position information to the other stations such that any of the 8 communication time slots is used, the radio modem unit 40 converts the transmission data of the position information into a format that can be transmitted by the radio device 53, and the radio device 53 conducts periodic information transmission using the communication time slots via the communication antenna 54.

Next, the process by which the operation unit 30 determines the transmission timing of the periodic position information packet will be described using FIG. 5.

As in FIG. 5, the mobile stations (first station, second station, third station) conducting communication are completely time-synchronized by precisely measured time such as GPS time, and the transmission timings (communication time slots), in which the fundamental periods (fundamental transmission periods) are divided by the shortest transmission time, are defined. When a mobile station is to transmit its periodic position information by "fundamental frequency× 1", first, it verifies the use status of the communication time slots during one period (packet use status verification time) of the fundamental periods, and starts transmitting its periodic position information packet, like position information packet 2 in FIG. 5, at a communication timing judged to be an empty time slot.

As in FIG. 5, the first station first transmits its position information packet (at this time, the number of simultaneously active mobile stations in the header is 1), and next, when the second station starts transmitting its position information packet, the number of simultaneously active mobile stations in the header becomes 2, and normal communication is verified.

When there are several mobile stations that have conducted packet use status verification at the same time and each has conducted data transmission at a communication timing judged to be an empty time slot, communication interference occurs between the second station and the third station, as shown in the example of FIG. 6. In this case, because reception cannot be normally conducted by the receiving station, the number of simultaneously active mobile stations in use at the current point in time included in the communication data (header) of the first station does not increase. Thus, the fact that the communication timing could not be normally acquired is detected, and the communication timing is randomly shifted from among the empty time slots and data communication is again conducted.

Further, the position information display device 60 is connected to the operation unit 30 via the Ethernet (registered trademark), the operation unit 80 conducts map processing using the map data 91, and the display unit 93 displays not just the position of its own station but the received position information of the other mobile stations 1 on a map together with the movement trajectory.

The base station 100 operates in the same manner as the mobile stations 1.

That is, the operation unit 130 defines communication time slots for time division communication based on precisely measured time such as time information received by the GPS antenna 111, and the radio device 153 conducts time division synchronous communication via the communication antenna 154. The position information of the other stations received from the other stations is stored in the shared data 192 of the position information display device 160 and displayed on the display unit 193 together with the map data 191.

The mobile stations 1 and the base station 100 both convert audio information inputted/outputted by the microphones 52 and 152 and the speakers 51 and 151 and conduct audio communication with the radio modem units 40 and 140.

Next, the position information transmission processing by the operation unit 30 of the time division synchronous radio modem device 20 will be described on the basis of FIG. 7.

The GPS receiving unit 21 receives the position information of its own station (step S1).

The position information sending unit 31 transmits this received position information of its own station to the position information display device 60 every second (step S2).

The communication status judging unit 32 judges whether or not communication of the periodic position information to the other stations is being implemented (step S3).

When transmission to the other stations is set to a stopped status, then the processing ends. When periodic position information communication is to be newly started and when the transmission period has been changed, then the processing proceeds to step S4, and when the transmission period is as is and implementation of periodic position information communication is being continued, then the processing moves to later-described step S7.

When periodic position information communication is to be newly started, then the communication status judging unit 32 verifies the packet use status and the number of simultaneously active mobile stations (step S4).

The communication status judging unit 32 then judges whether or not the time of the fundamental period set by the fundamental period setting means 71 has elapsed (step S5).

When the time of the fundamental period has not elapsed, then the processing moves to step S4, and when the time of the fundamental period has elapsed, then the transmission timing control unit 33 sets the transmission timing of the transmission period determined by the transmission period determining unit 22 to an empty time slot. As in FIG. 8, when the transmission periods have been set in divisional periods of the fundamental periods by the transmission period determining unit 22 such as "½ of fundamental period" and "¼ of fundamental period", then timings when plural time slots are empty are found and set (step S6).

Next, the transmission timing control unit 33 judges whether or not the transmission timing has been arrived at (step S7).

When the transmission timing has not been arrived at, then the processing moves to step S1, and when the transmission timing has been arrived at, then the transmission timing control unit 33 transmits the position information of its own station to the radio modem unit 40 (step S8).

Next, the transmission timing control unit 33 judges whether or not the number of simultaneously active mobile stations has increased (step S9).

When the number of simultaneously active mobile stations has increased, then the transmission timing control unit 33 regards this to mean that it was able to normally transmit the position information, and the processing moves to step S1. When the number of simultaneously active mobile stations has not increased, then the transmission timing control unit 33 regards this to mean that it was not able to normally transmit the position information and shifts and determines the transmission timing to an empty time slot (step S10), and the processing moves to step S1.

As a result, the obtained position information of its own station and of the other stations is stored in the shared data 92 and displayed by the display unit 93 together with the map data 91.

According to the first embodiment, the data transmission timing is determined by the operation unit 30 of the time division synchronous radio modem device of each mobile station. Thus, time division synchronous communication can be conducted without the intervention of a communication control station such as the base station 100, and even when communication with the base station is cut off, the mobile stations can automatically and periodically conduct communication of position information without causing communication interference between the mobile stations, and the information can be shared between the plural mobile stations.

Moreover, time division slots can be effectively utilized by automatically varying the transmission periods of the position information in accordance with the moving speeds of own stations (e.g., varying the transmission period in inverse proportion to speed). Thus, the positions of more mobile stations can be grasped, and communication time leeway to transmit other information such as images can be obtained.

Further, not just the position of an own station but the position information (current position and movement history) of other stations that has been transmitted and received can be verified on a map the position information display device 60. Thus, overall grasping becomes possible between the mobile stations when joint activity or solitary activity is conducted by plural mobile stations, and activity efficiency can be raised.

As is apparent from the above description, regardless of whether or not the base station 100 is present in this system, the operation of the system is not affected.

Second Embodiment

FIG. 9 is a block diagram showing a mobile object information sharing system according to a second embodiment of this invention.

In the second embodiment, in addition to the system configuration of the first embodiment shown in FIG. 1, an activity status storage unit 23 that stores the activity status of its own station inputted from the input/output unit 70 of the position information display device 60 is disposed in the time division synchronous radio modem device 20, and the transmission period determining unit 22 determines the transmission period on the basis of a table prepared beforehand in accordance with the activity status of its own station stored in the activity status storage unit 23.

The activity status referred to here is the moving status of the mobile object or, if the mobile object is a vehicle that conducts some kind of work, whether or not the mobile object is in the middle of that work. For example, if the mobile object is a taxi, then the activity status is whether the taxi is in service (running on a fare) or empty (cruising around for passengers), and if the mobile object is a truck, then the activity status is whether the truck is in transit or empty (returning to the company). When the mobile object is stopped and conducting some kind of work or when the taxi is empty, then the transmission period can be set longer, and when the mobile object is in motion or when the taxi is in service, then the transmission period can be shortened, so that their positions can be precisely grasped.

FIG. 10 is a descriptive diagram when the position information transmission period in the mobile object information sharing system according to the second embodiment of this invention is varied. Reference numerals 2 and 3 are the same as in FIG. 5, so detailed description thereof will be omitted.

In the first embodiment, a case was described where the periodic position information transmission period was fixed, but in the second embodiment, means for switching the periodic position information transmission period is disposed in the operation unit 30 so that, as shown in FIG. 10, the periodic position information transmission period can be varied in the middle of periodic communication.

The periodic position information transmission period is set by a period reduced to one/an integer of the fundamental period as shown in A to B to C in FIG. 10. Thus, overlapping of communication time slots does not occur between different periods. When three or more periodic position information transmission periods are disposed, they are set such that they become periods of one/an integer of a period one step longer.

In FIG. 10, A transmission period is the fundamental period, B transmission period is ½ of A transmission period, and C transmission period is ¼ of A transmission period. At this time, assuming that the fundamental period is 8 minutes, the communication time slots are 15 seconds, and the number of communication time slots is 32, then A transmission period is 8 minutes, B transmission period is 4 minutes, and C transmission period is 2 minutes. It will be noted that even the shortest transmission period becomes an integral multiple of the shortest transmission time.

In FIG. 10, an example is shown where the periodic position information transmission period is changed to B transmission period after the packet use status verification time when conversion processing of A transmission period to B transmission period of the periodic position information transmission period of the first station is conducted.

By making variable the periodic position information transmission period in this manner, the periodic position information transmission period can be changed in accordance with the moving speed of the mobile station and the degree of importance of the activity content.

According to the second embodiment, the periodic position information transmission period is automatically changed in accordance with the activity status of its own station. Thus, for example, by setting the transmission period to be long when the mobile object stops and conducts some kind of work and setting the transmission period to be short when the mobile object is in motion, the amount of information to be transmitted (transmission frequency) can be changed, the use efficiency of one radio frequency increases, and information can be more efficiently shared between the mobile stations.

Third Embodiment

FIG. 11 is a block diagram showing a mobile object information sharing system according to a third embodiment of this invention.

The third embodiment is a case where, in addition to the system configuration of the first embodiment shown in FIG. 1, a movement monitoring unit 24 is disposed which monitors the moving status of its own station and stores the time and position when the mobile station changes direction (direction change here refers to a case where the moving direction changes equal to or greater than a predetermined angle within a predetermined time; specifically, this predetermined time and predetermined angle differ depending on the type of mobile object, such as whether the mobile object is a ship or a vehicle, for example).

In order to facilitate understanding of the operation of the present embodiment, FIGS. 12 show trajectories that are displayed in the case of the first embodiment and the case of the third embodiment in the display unit 93 of the position information display device 60.

FIG. 12(a) shows an actual trajectory followed by a mobile object. FIG. 12(b) is a trajectory display where, in the first embodiment, the position information is transmitted by periodic position information communication by "fundamental frequency×1" and displayed by the display units 93 of the position information display devices 60 of the other stations. FIG. 12(c) is a trajectory display where, in the third embodiment, the position information transmitted by periodic position information communication is displayed by the display units 93 of the position information display devices 60 of the other stations. In FIG. 12(b) and FIG. 12(c), the actual movement trajectory (same as in FIG. 12(a)) represented by the dotted line is not displayed by the display units 93 but is shown here for the purpose of comparison.

Next, the operation will be described.

The movement monitoring unit 24 looks at before-and-after value changes in the position information and the time information acquired by the GPS receiving unit 21 and monitors whether the mobile object is altering its traveling direction and changing direction. When it is determined that the mobile object has changed direction, then the position information and the time information are stored by the movement monitoring unit 24. The operation unit 30 conducts periodic position information communication at the transmission timing, but if there is information of a direction change in the movement monitoring unit 24 at the timing of transmitting the position information of its own station in step S7 in FIG. 7, then the operation unit 30 transmits that information instead of the current position information. If there is no information of a direction change in the movement monitoring unit 24, then the operation unit 30 transmits the current position information as had been the case until now.

At point P in FIG. 12-(c), the movement monitoring unit 24 that has detected the fact that the mobile object is greatly changing direction stores the information of point X. The transmission timing is arrived at when the mobile object is at point D, but because there is information of the point P in the movement monitoring unit 24, the information of the point X is transmitted rather than the information of the point D. At the other point A, point B, point C and point E, position information at the current points in time is transmitted because there is no information in the movement monitoring unit 24 that the mobile object has changed direction, whereby a trajectory with less error such as shown in FIG. 12(c) is displayed by the display units 93 of the position information display devices 60 of the other stations.

According to the third embodiment, rather than position information at that time, information of the position when the mobile object has changed direction before then is sent by periodic position information communication. Thus, this can be conveyed to the other stations in a form closer to the actual movement trajectory. Therefore, accurate position information of the mobile object can be grasped between the mobile objects and the base, and accurate instruction from the base and cooperative activity between the mobile objects can be more efficiently conducted.

INDUSTRIAL APPLICABILITY

The mobile object information sharing system of this invention can be used in the verification of the positions of individuals by mobile telephones, in the verification of the positions of vehicles such as taxis, and in the verification of the positions of rescue buoys.

Figure 1:
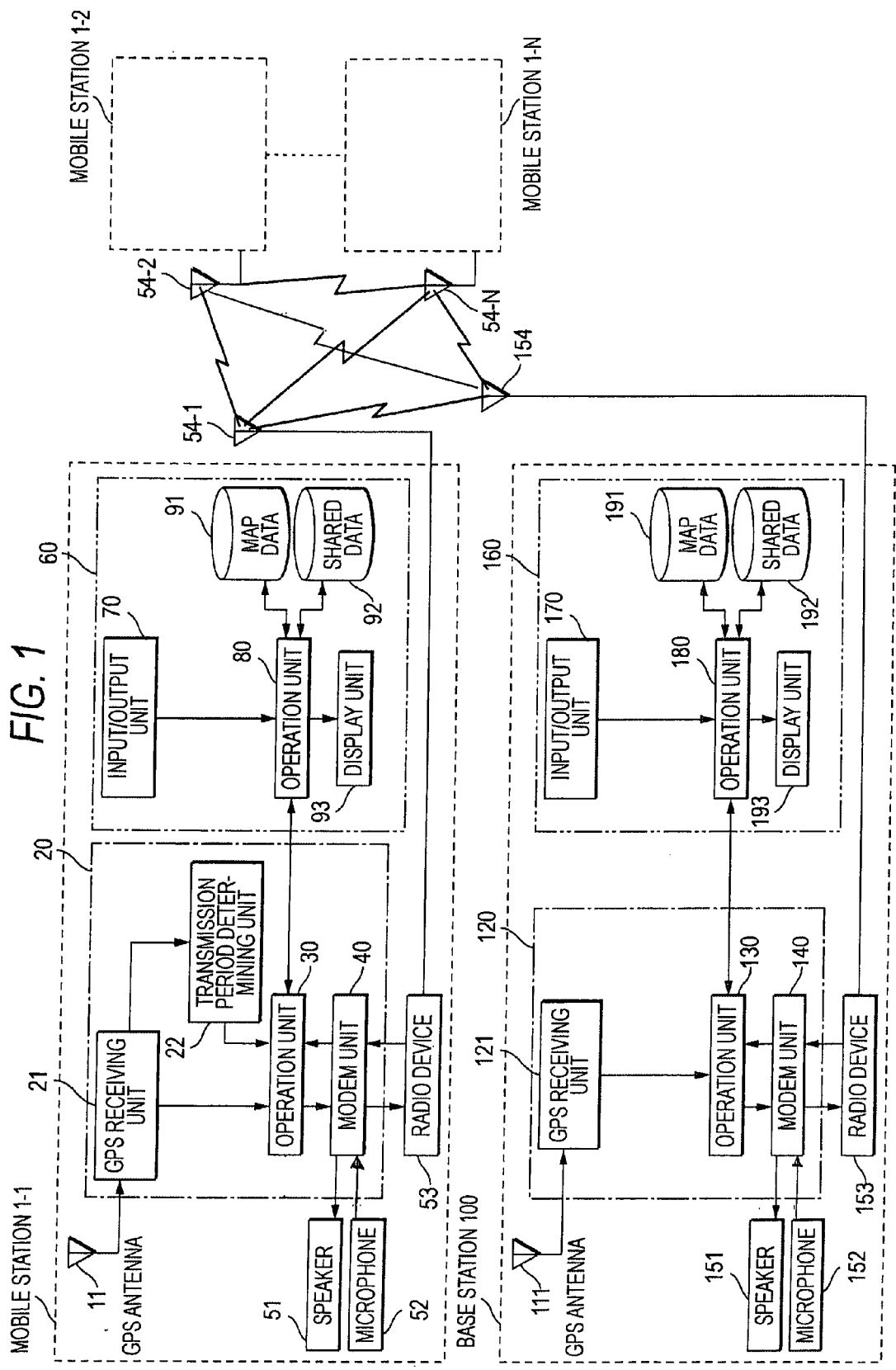
[FIG. 1] A block diagram showing a mobile object information sharing system according to a first embodiment of this invention.
Figure 2:
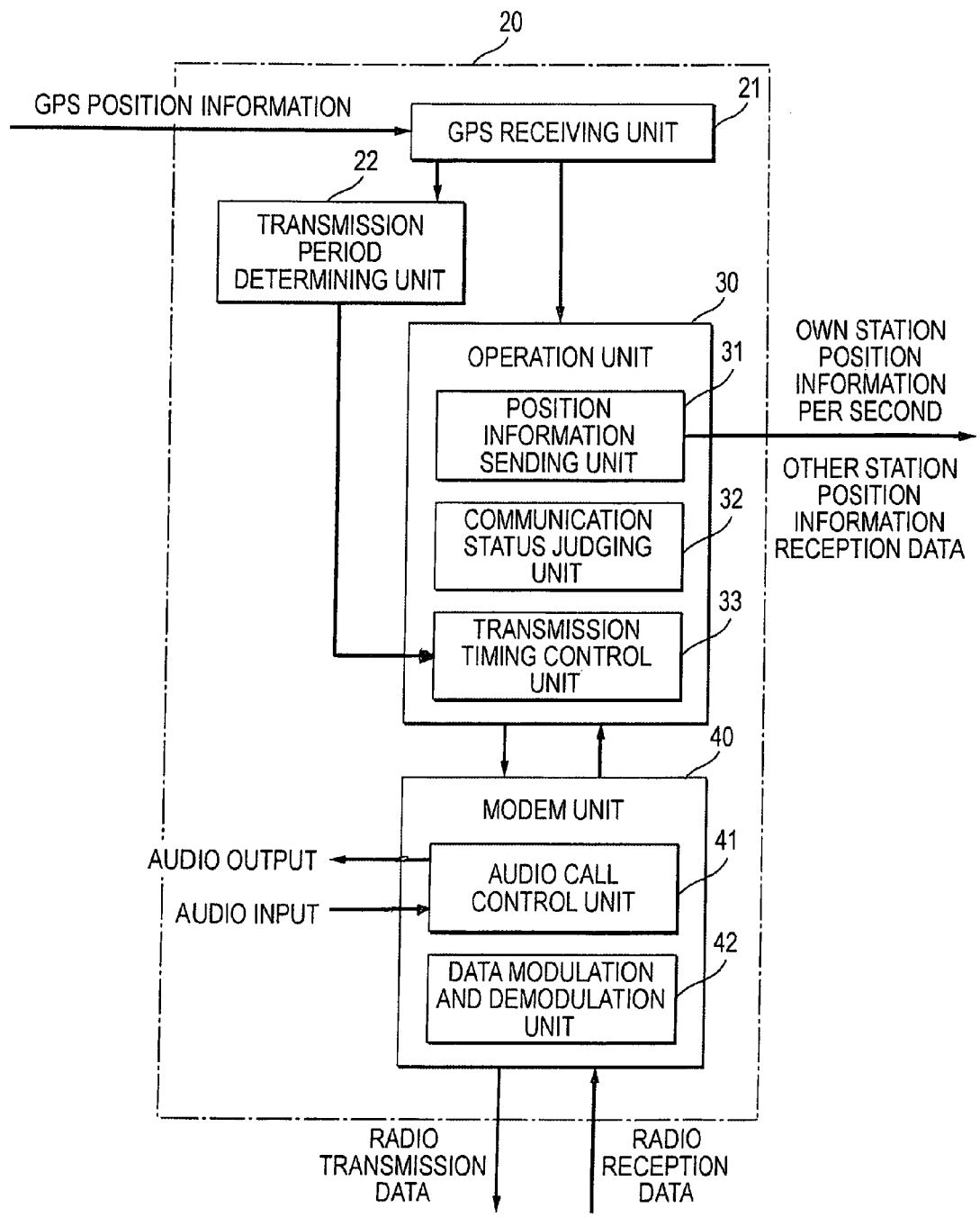
[FIG. 2] A block diagram showing a time division synchronous modem device in the mobile object information sharing system according to the first embodiment of this invention.
Figure 3:
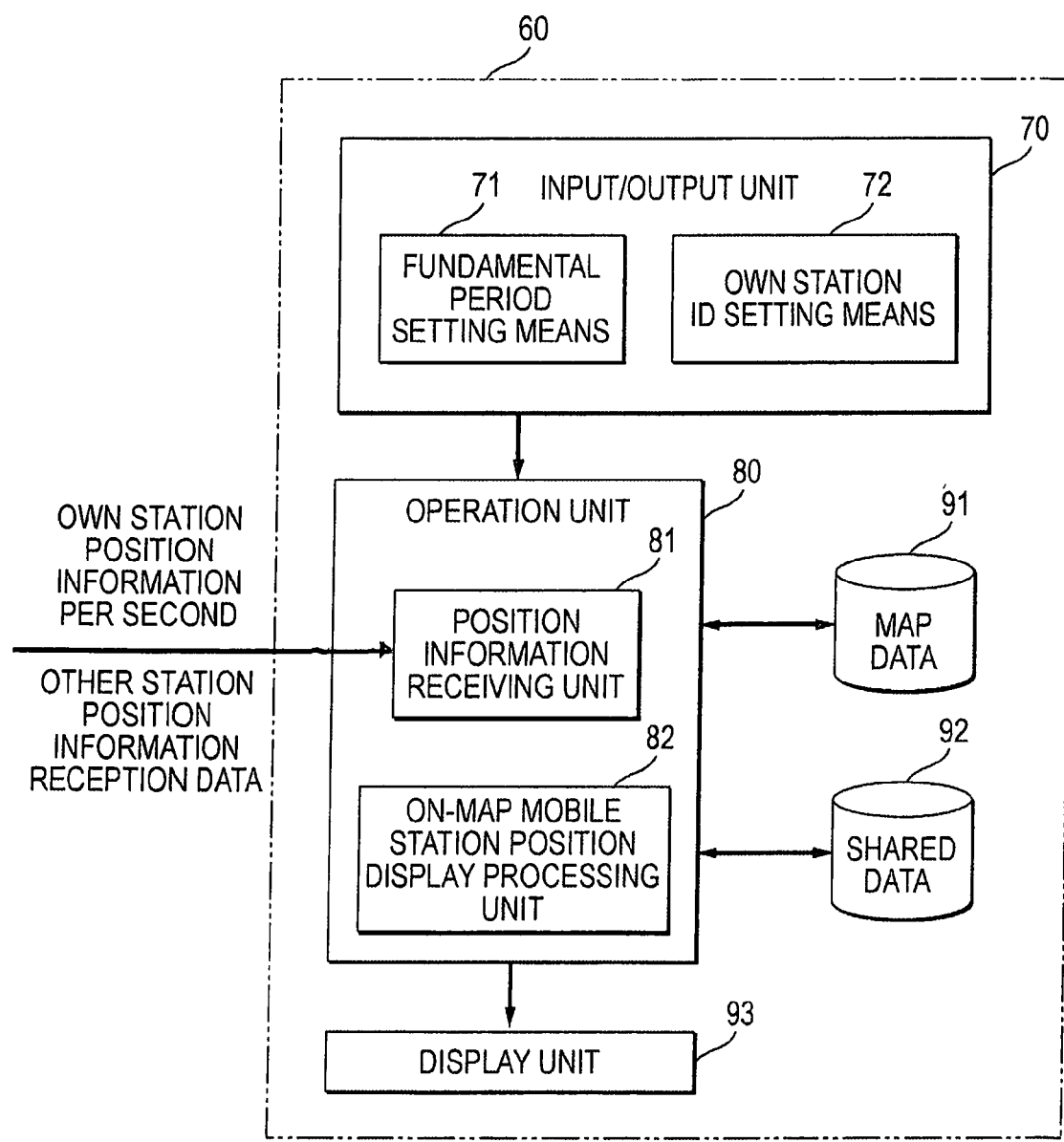
[FIG. 3] A block diagram showing a position information display device in the mobile object information sharing system according to the first embodiment of this invention.
Figure 4:
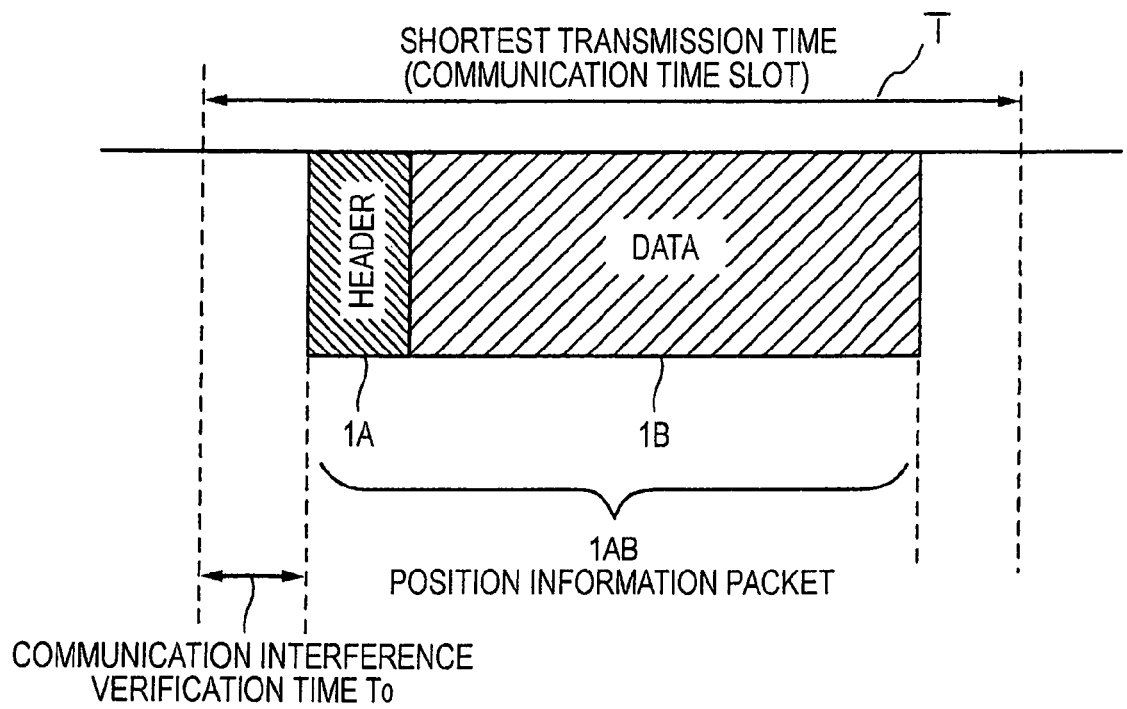
[FIG. 4] A diagram showing a position information packet in the mobile object information sharing system according to the first embodiment of this invention.
Figure 5:
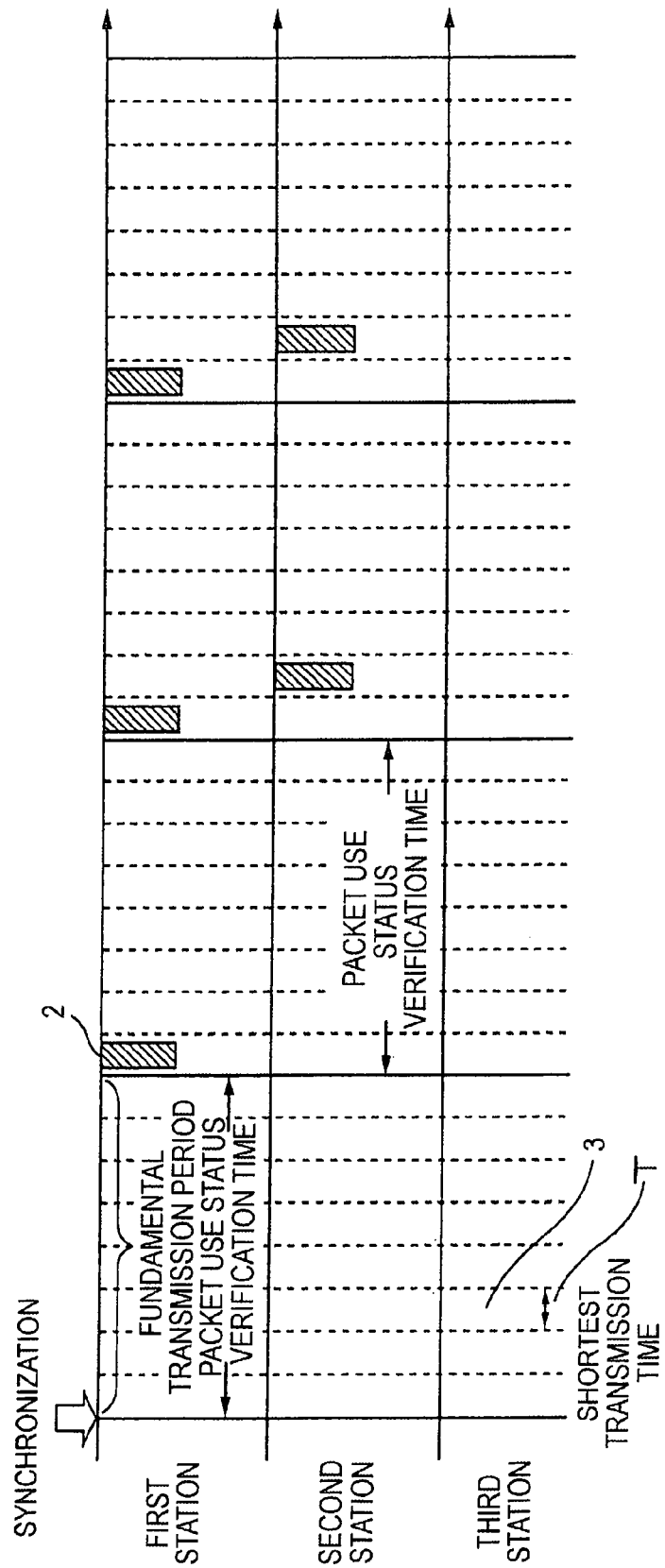
[FIG. 5] A diagram showing position information packet transmission timings in the mobile object information sharing system according to the first embodiment of this invention.
Figure 6:
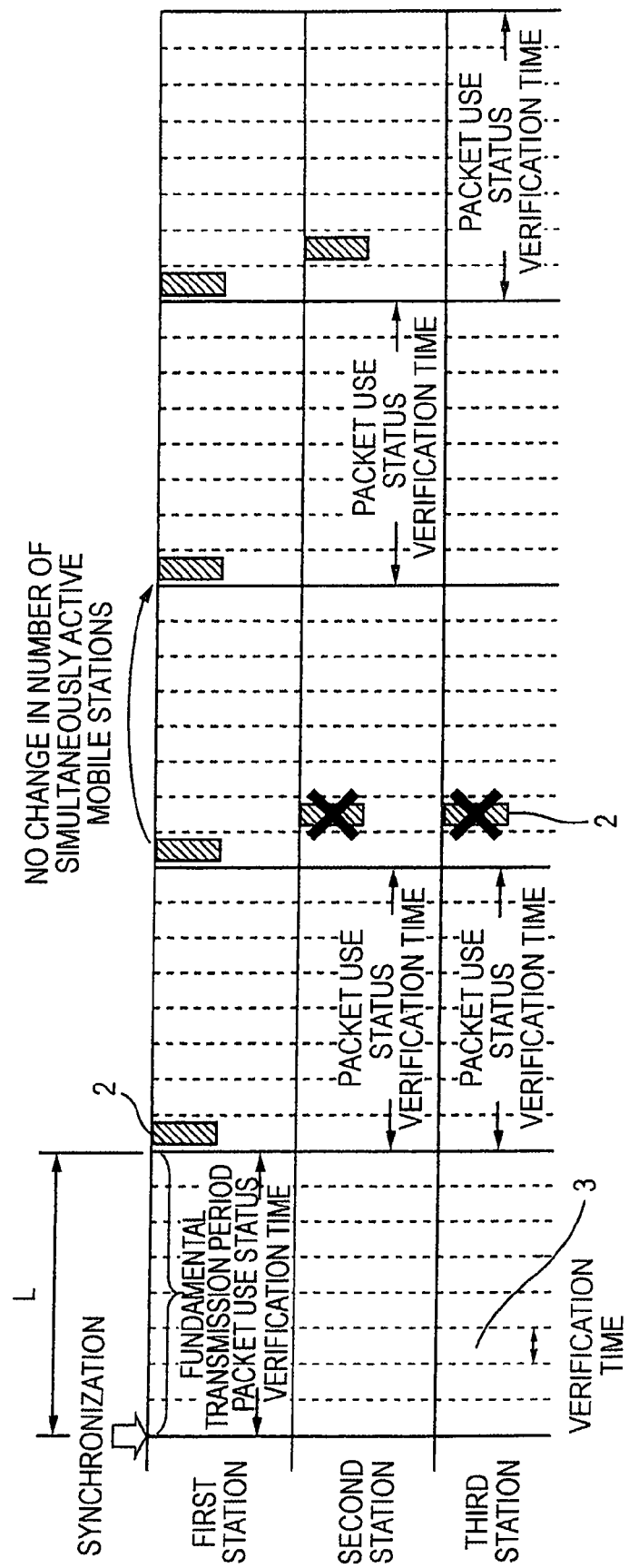
[FIG. 6] A diagram showing transmission timings after interference of position information packets in the mobile object information system according to the first embodiment of this invention.
Figure 7:
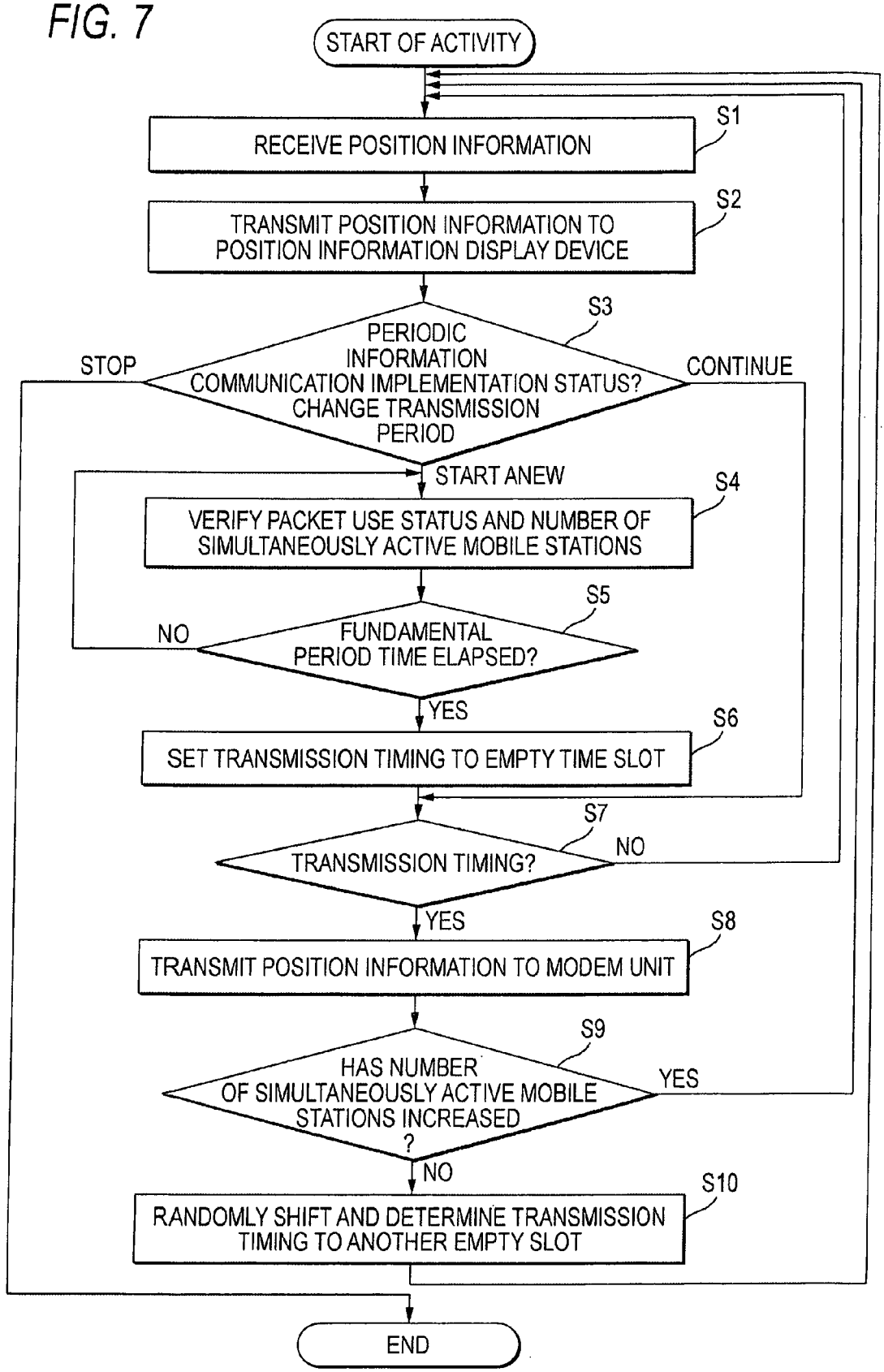
[FIG. 7] A flowchart showing position information transmission processing by an operation unit of the time division synchronous radio modem device in the mobile object information sharing system according to the first embodiment of this invention.
Figure 8:
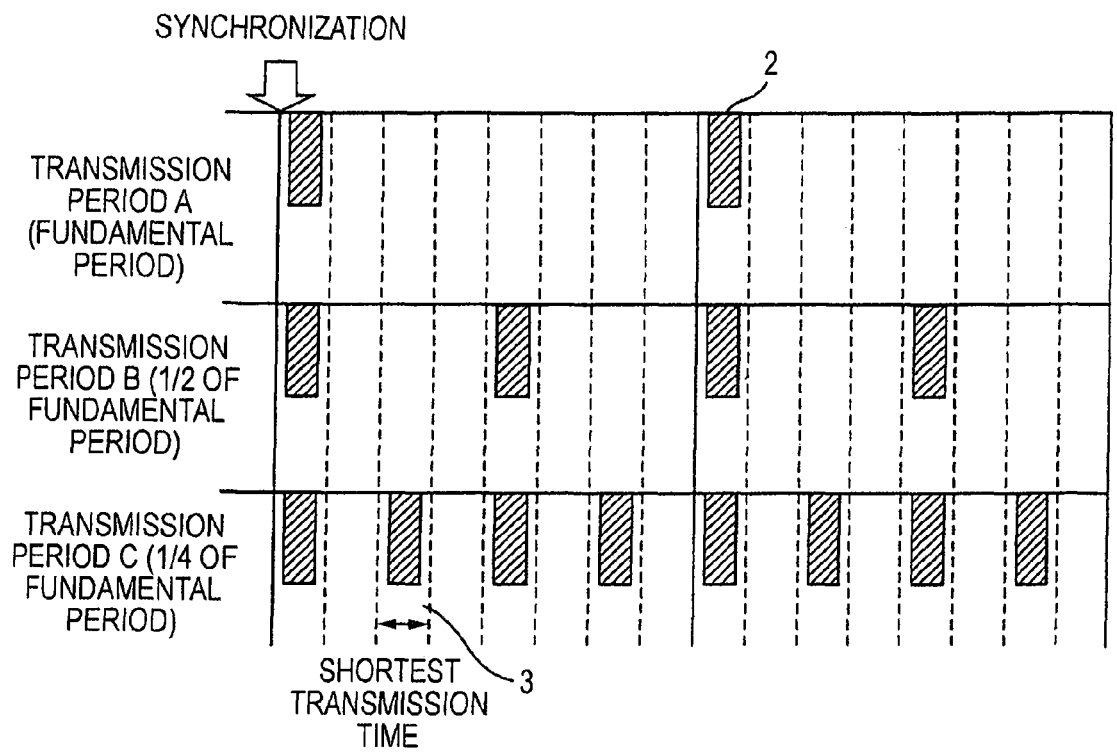
[FIG. 8] A diagram showing various position information transmission periods in the mobile object information sharing system according to the first embodiment of this invention.
Figure 9:
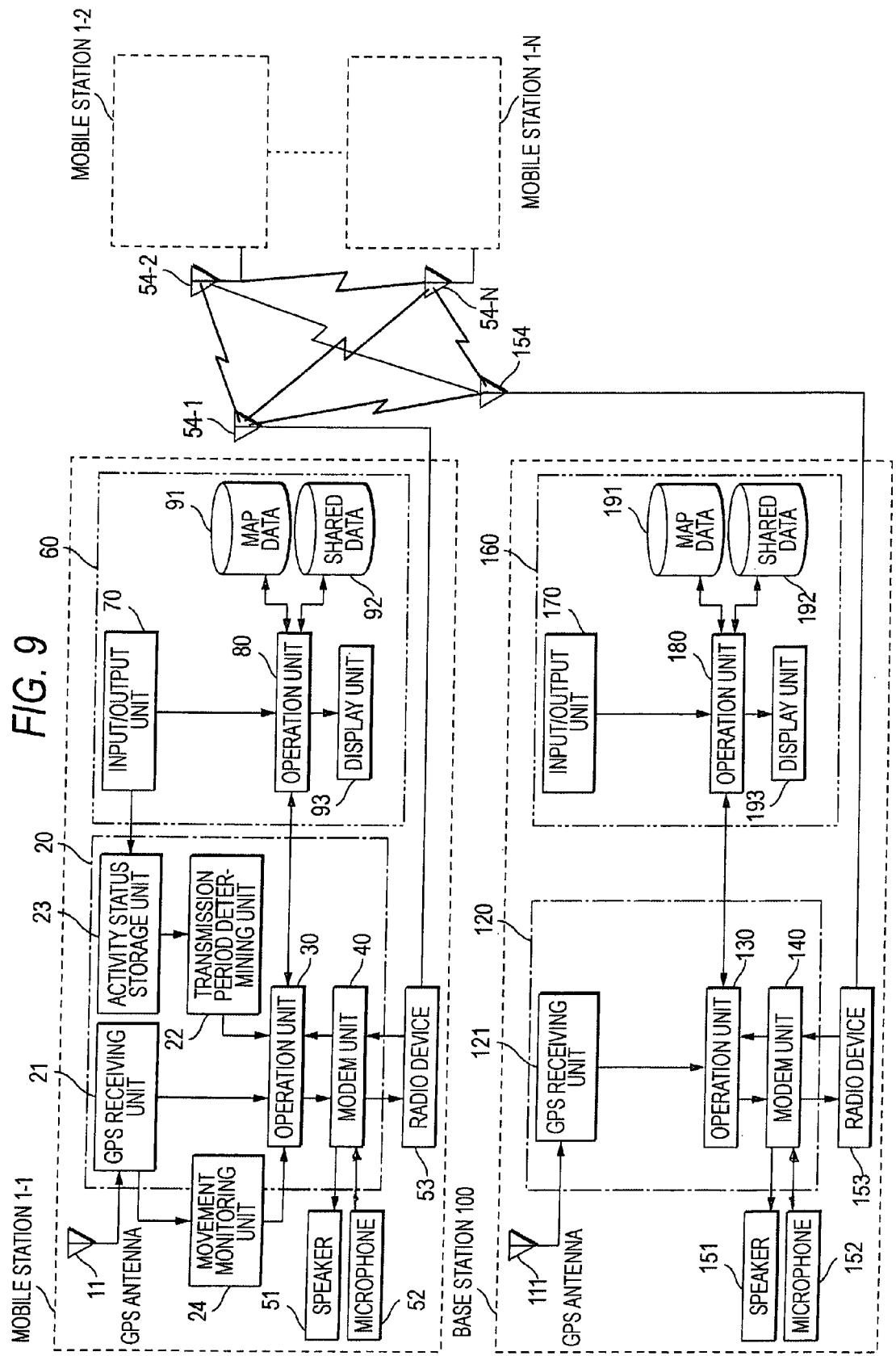
[FIG. 9] A block diagram showing a mobile object information sharing system according to a second embodiment of this invention.
Figure 10:
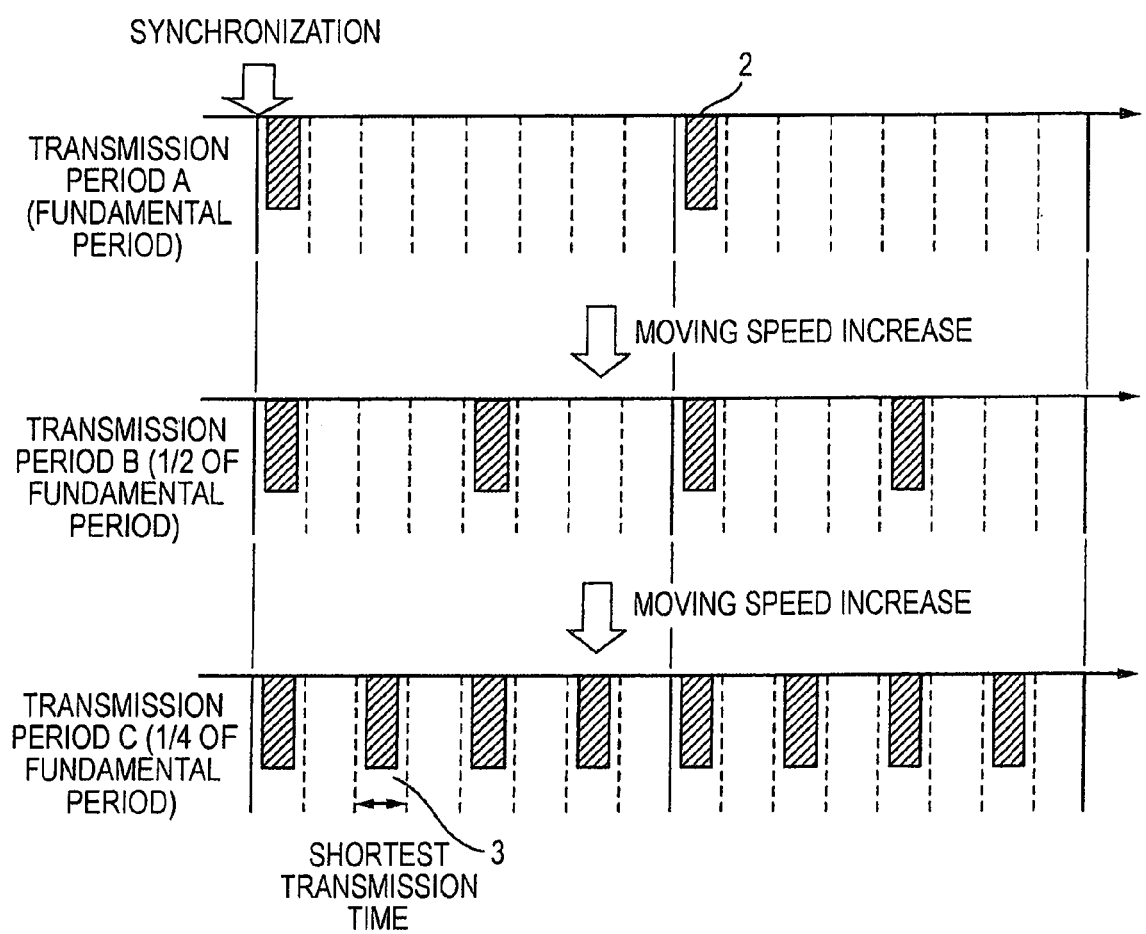
[FIG. 10] A diagram showing the changing of a position information transmission period for describing the operation of FIG. 9.
Figure 11:
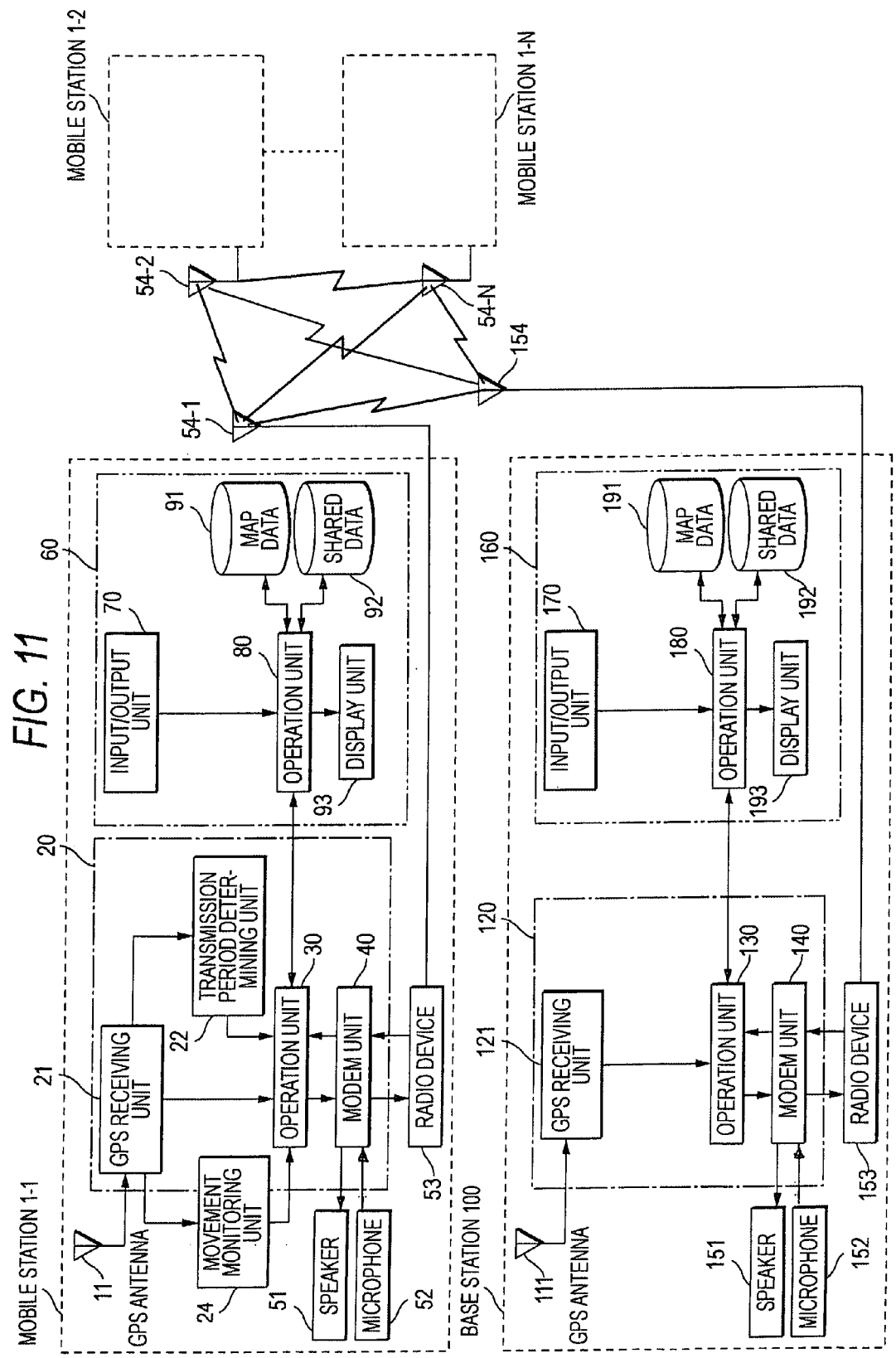
[FIG. 11] A block diagram showing a mobile object information sharing system according to a third embodiment of this invention.
Figure 12:
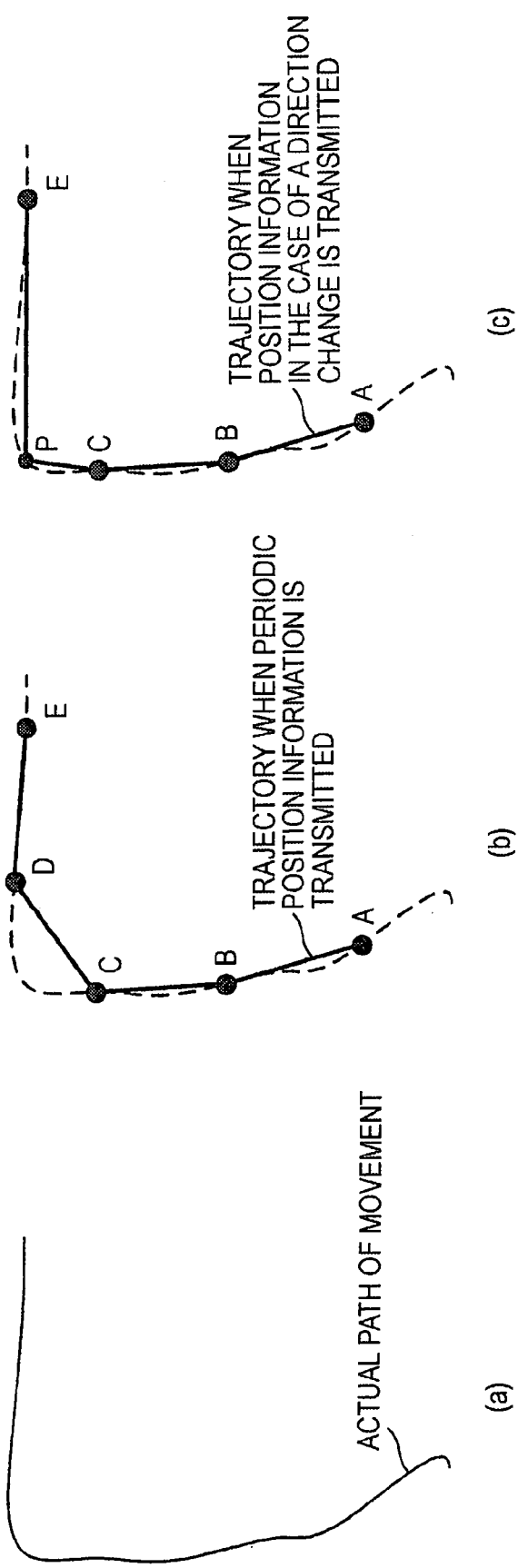
[FIGS. 12] Examples of trajectory displays displayed on the position information display device in the mobile object information sharing system according to the third embodiment of this invention.

DESCRIPTION OF THE REFERENCE NUMERALS 1-1 to 1-N Mobile Stations
20 Time division synchronous Radio Modem Device
21 GPS Receiving Unit
22 Transmission Period Determining Unit
30 Operation Unit
53 Radio Device
54 Antenna
60 Position Information Display Device
100 Base Station
120 Time division synchronous Radio Modem Device
121 GPS Receiving Unit
122 Transmission Period Determining Unit
130 Operation Unit
153 Radio Device
154 Antenna

The invention claimed is:

1. A mobile object information sharing system comprising a plurality of mobile stations, wherein each mobile station includes:
a radio device for communicating mutually at one radio frequency;
a GPS receiver that obtains, by GPS radio waves, at least position information and moving speed information of its own station and shared time information;
a time division synchronous radio modem device that synchronizes mutually among the plurality of mobile stations using the shared time information, after this time synchronization, sets a fundamental transmission period by arranging continuously a plurality of transmission slots having a predetermined time width, verifies the use status of the plurality of transmission slots during the fundamental transmission period, transmits the position information of its own station to the radio device in an optional period of the plurality of transmission slots, and receives the position information of other mobile stations;
a transmission period determining unit for determining the optional period using the moving speed of the mobile station; and
an operation unit that determines a transmission timing among the plurality of transmission slots based on the optional period determined by the transmission period determining unit and transmits the position information of its own station, and
the mobile station further includes a movement monitoring unit that monitors the movement trajectory of its own station and, when the moving direction has changed equal to or greater than a predetermined angle within a predetermined time, stores the position and the time, and when the position and the time is stored in the movement monitoring unit, the mobile station transmits the information of the position and the time at a timing of the position information of its own station immediately after the time.

2. A mobile object information sharing system comprising a base station and a plurality of mobile stations wherein each mobile station includes:
a radio device for communicating mutually at one radio frequency;

a GPS receiver that obtains, by GPS radio waves, at least position information and moving speed information of its own station and shared time information;

a time division synchronous radio modem device that synchronizes mutually among the plurality of mobile stations using the shared time information, after this time synchronization, sets a fundamental transmission period by arranging continuously a plurality of transmission slots with a predetermined time width, verifies the use status of the plurality of transmission slots during the fundamental transmission period, transmits the position information of its own station to the radio device in an optional period of the plurality of transmission slots, and receives the position information of other mobile stations, wherein the optional period is a divisional period of the fundamental transmission period;

a transmission period determining unit for determining the optional period using the moving speed of the mobile station; and an operation unit that determines a transmission timing among the plurality of transmission slots based on the optional period determined by the transmission period determining unit and transmits the position information of its own station, and the mobile further includes a movement monitoring unit that monitors the movement trajectory of its own station and, when the moving direction has changed equal to or greater than a predetermined angle within a predetermined time, stores the position and the time, and when the position and the time is stored in the movement monitoring unit, the mobile station transmits the information of the position and the time at a timing of the position information of its own station immediately after the time.

* * * * *